8936X
E. MEILY, Jr. & J. & S. MELLINGER.
WEAVING MACHINE.
Patented June 26, 1835.
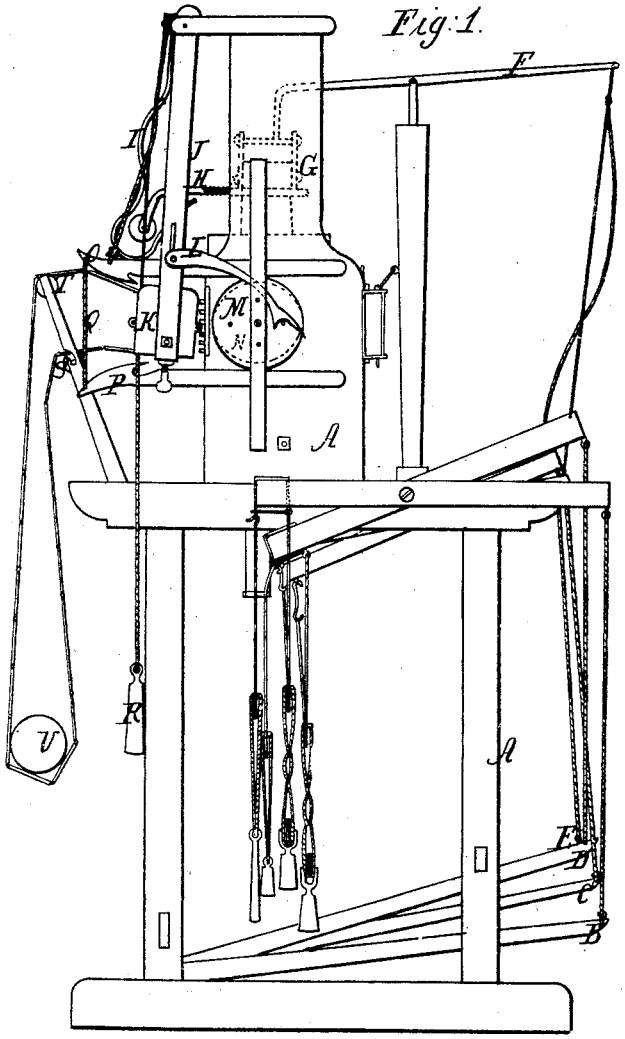
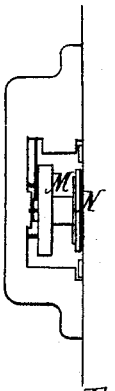
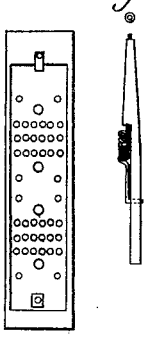
THE NORRIS PETERS CO., PHOTO-LI HO., WASHINGTON, D. C.

United States Patent Office

PTO - BOYERS, PA Duty Station

MISSING PAGE TEMPORARY NOTICE

PATENT # 8936X FOR ISSUE DATE June 26, 1835 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Text.

Data Conversion Operation

Boyers, Pa